United States Patent

Nomura et al.

[11] Patent Number: 5,877,872
[45] Date of Patent: Mar. 2, 1999

[54] FACSIMILE APPARATUS

[75] Inventors: Akio Nomura, Kyoto; Hiroaki Funai, Hiroshima, both of Japan

[73] Assignee: Murata Kikai Kabushiki Kaisha, Kyoto, Japan

[21] Appl. No.: 940,956

[22] Filed: Oct. 8, 1997

Related U.S. Application Data

[63] Continuation of Ser. No. 698,686, Sep. 4, 1996, abandoned, which is a continuation of Ser. No. 354,523, Dec. 13, 1994, abandoned.

[30] Foreign Application Priority Data

Dec. 21, 1993 [JP] Japan .................................. 5-321744
Jan. 28, 1994 [JP] Japan .................................. 6-008408

[51] Int. Cl.⁶ .................................................. H04N 1/32
[52] U.S. Cl. .......................... 358/468; 379/65; 379/93.09
[58] Field of Search .............................. 379/53, 54, 60, 379/63, 65, 88, 81, 89, 82, 100.1, 90.01, 91.02, 92.03, 93.09, 100.05, 100.09, 100.15; 358/468, 442, 407, 400

[56] References Cited

U.S. PATENT DOCUMENTS 4,074,081 2/1978 Humm ....................................... 379/82
5,369,688 11/1994 Tsukamoto et al. ..................... 379/100

FOREIGN PATENT DOCUMENTS 0001373 1/1983 Japan ..................................... 358/468

Primary Examiner—David K. Moore
Assistant Examiner—Jerome Grant, II
Attorney, Agent, or Firm—Loeb & Loeb LLP

[57] ABSTRACT

When there is a call from outside while a conversation is being had between handsets through an extension line on the called side, a facsimile communication control module is connected with a communication line if a facsimile machine is set to a facsimile signal reception mode whereas users of the handsets are informed of arrival of a call from outside and one handset which is still off hooked after a predetermined period is connected with the communication line if the facsimile machine is set to another mode.

1 Claim, 9 Drawing Sheets

FACSIMILE APPARATUS

This is a continuation of application Ser. No. 08/698,686 filed on Sep. 4, 1996 and now abandoned, which is itself a continuation of application Ser. No. 08/354,523 filed on Dec. 13, 1994, also abandoned.

BACKGROUND OF THE INVENTION

1. Technical Field

The present invention relates to a facsimile apparatus which is connectable with a plurality of telephones (handsets) and which allows extension-line-communication between the telephones.

1. Background Art

For example, a conventional facsimile machine of the above-mentioned type is connected with a built-in handset and a second handset and allows extension-line-communication between these handsets. It would be convenient if an in-house handset user would be informed of the fact that a call comes from outside (e.g., a communication terminal) during the in-house or extension line communication. Generally, the conventional facsimile machine activates a buzzer, which is incorporated therein, to give notice of such a calling.

However, since the conventional facsimile machine only makes a buzzer sound, the in-house handset user cannot know whether it is a call from a person or a facsimile machine. Accordingly, the user on the called side should interrupt his/her conversation when he/she hears the buzzer, and then determine whether a voice or a facsimile signal is transmitted from outside. If a voice is heard, the user on the called side will talk with the calling person without any inconvenience. However, if it is a facsimile signal, the user should switch the connection of the line or trunk from the telephone to the facsimile machine to receive the facsimile signal. This is inconvenient and troublesome.

Another type of conventional facsimile apparatus has a facsimile communication control module connected with a communication line. (A branch telephone of the facsimile apparatus is also connected with the line.) In this arrangement, in order to detect on-hooking and off-hooking of the branch, telephone, the conventional facsimile apparatus generally includes a hook detector circuit which determines the hooking state of the branch telephone by comparing the voltage of the line with a reference voltage. When the branch telephone is off hooked, the voltage of the line generally drops, for example from 48 V to about 10 V. Taking advantage of this, an appropriate value between 10 V and 48 V is chosen as the reference voltage and it is compared with the voltage of the line. If the former is lower than the latter, the facsimile apparatus judges that the branch telephone is on-hooked. Otherwise, it is judged that the branch telephone is in an off-hook state. In short, the conventional facsimile apparatus employs an analog hook-state detecting circuit to determine the on/off hooking of the branch telephone.

If a second handset is further attached to the facsimile apparatus via a modular jack, it is necessary to detect dial pulses from the branch telephone and the second handset before a call from outside is transferred to the branch telephone or the second handset or when a user of one handset wants to talk to another user of the other handset. In this case, the conventional facsimile apparatus analogously processes the voltage of the line during generation (or transmission) of the dial pulses to detect the number of the dial pulses. Specifically, the number of the dial pulses is determined based on output from a photocoupler which detects an off-hooking of the telephone (or handset). The dial pulse originally has a rectangular or square waveform as illustrated in FIG. 10 of the accompanying drawings, but the waveform may have crackings as depicted in FIG. 11 for various reasons. If the dial pulse has such a waveform, it is not possible to correctly determine the number of the dial pulses.

This type of facsimile apparatus is desired to receive a facsimile signal from outside without making any sound (ringing or bell sound) at a built-in handset when a ringing signal is transmitted from a line switching device, for example, when the facsimile apparatus is in a dial-in mode (a mode for a direct inward dialing) or a telephone/facsimile mode. Conventionally, in order to perform such a no-ringing reception, a relay switch between the communication line and the built-in handset is turned off to disconnect the built-in handset from the communication line.

For this end, however, the conventional facsimile apparatus should include a relay switch to connect and disconnect the built-in handset with/from the communication line so that an additional cost for such a switch is required and a switching control for the switching operation is also necessary.

In addition, since the conventional facsimile apparatus turns off the relay switch to disconnect the built-in handset from the communication line, it is impossible to use various functions and elements incorporated in the built-in handset such as a speech network during the disconnected state.

SUMMARY OF THE INVENTION

A first object of the present invention is to provide an improved facsimile apparatus which eliminates the inconvenience that the extension line communication is always interrupted when a call comes from outside during the extension line communication in order to perform a switching operation for reception of a voice or a facsimile signal from outside.

A second object of the present invention is to provide an improved facsimile apparatus which can detect the hooking state of a branch telephone in various conditions regardless of facsimile apparatus installation conditions such as a long distance from a central telephone exchanger.

A third object of the present invention is to provide a facsimile apparatus which prevents errors in detecting the number of the dial pulses transmitted from a branch telephone and/or a second handset, errors which would otherwise be caused by waveform crackings of the dial pulses.

A fourth object of the present invention is to provide a facsimile apparatus which eliminates the necessity of disconnecting the built-in handset from the communication line white the facsimile apparatus is receiving a facsimile signal from outside in a non-ringing receiving manner, whereby the construction and control of the facsimile apparatus are simplified and the utility of the built-in handset is improved.

To achieve the above-mentioned first object of the present invention, provided is a facsimile apparatus which is characterized in that when a call comes from outside during in-house conversation through an extension line between handsets (or telephones), a facsimile communication control module is connected with a line (trunk) if a stand-by mode of the facsimile apparatus is a facsimile signal (or image data) reception priority mode (mode in which priority is given to reception of a facsimile signal) whereas a user of the handset is informed of the arrival of the call and the off-hooked handset is connected with the line if the stand-by mode is in another mode. These operations are controlled by a control means. When the facsimile apparatus receives a call from outside while conversation is being had between a built-in handset and a second handset on the called side, the facsimile apparatus accepts image data from outside at the facsimile communication control module even if the conversation continues through the extension line. If a voice is received, no faesimile signal reception is conducted. However, since it is a user that has set the facsimile apparatus to the facsimile signal reception priority mode, he/she knows that no reception is made. On the other hand, if the facsimile signal reception priority mode is not selected, a user of the built-in handset and/or the second handset is informed of the arrival of the call. Then, one of the handsets (the off hooked one) is connected with the line by the control means. As long as the facsimile signal reception mode is not chosen, the users are only required to stop the conversation through the extension line. If the user of the built-in handset does not wish to talk with the calling party, he/she on-hooks the handset. Then, the other still off-hooked handset (second handset) is connected with the line for conversation with the calling party.

To achieve the second object of the present invention, the improved facsimile apparatus includes an A/D converter means for sampling a voltage of a line connected with a facsimile communication control module at predetermined intervals and converting it to a digital signal and a hooking state detector means for determining a hooking state of a handset connected with the line based on the digital signal from the A/D converter means. The hooking state detecting means may be a CPU. The voltage of the line varies with the state of hooking (on-hooking or off-hooking) of the handset. Thus, two voltage values (one acquired in an on-hook state and one acquired in an off-hook state) are used to determine the hooking state of the handset. Unlike conventional facsimile machines, the detected voltage is not compared with a certain fixed reference value, but with the voltage of the on/off-hook state. Therefore, even if a voltage of the line fluctuates due to a distance to a central telephone exchanger from the facsimile apparatus or other reasons, the hooking of the branch telephone (handset) is accurately known.

To accomplish the third object of the present invention, an improved facsimile apparatus includes a control means for outputting a control signal to prevent a ring means of a built-in handset from ringing when the facsimile apparatus is set to a mode which should receive a signal from outside in a silent manner. Therefore, even if the built-in handset is not disconnected from the communication line, the built-in handset does not ring while the signal from outside is being received. Since the built-in handset is connected with the communication line, it is not necessary to provide a relay switch for disconnecting the built-in handset from the communication line. Further, since various elements associated with the built-in handset are also connected with the communication line, it is possible to effectively use these elements.

DETAILED DESCRIPTION OF THE PREFERRED EMBODIMENTS

Figure 1:
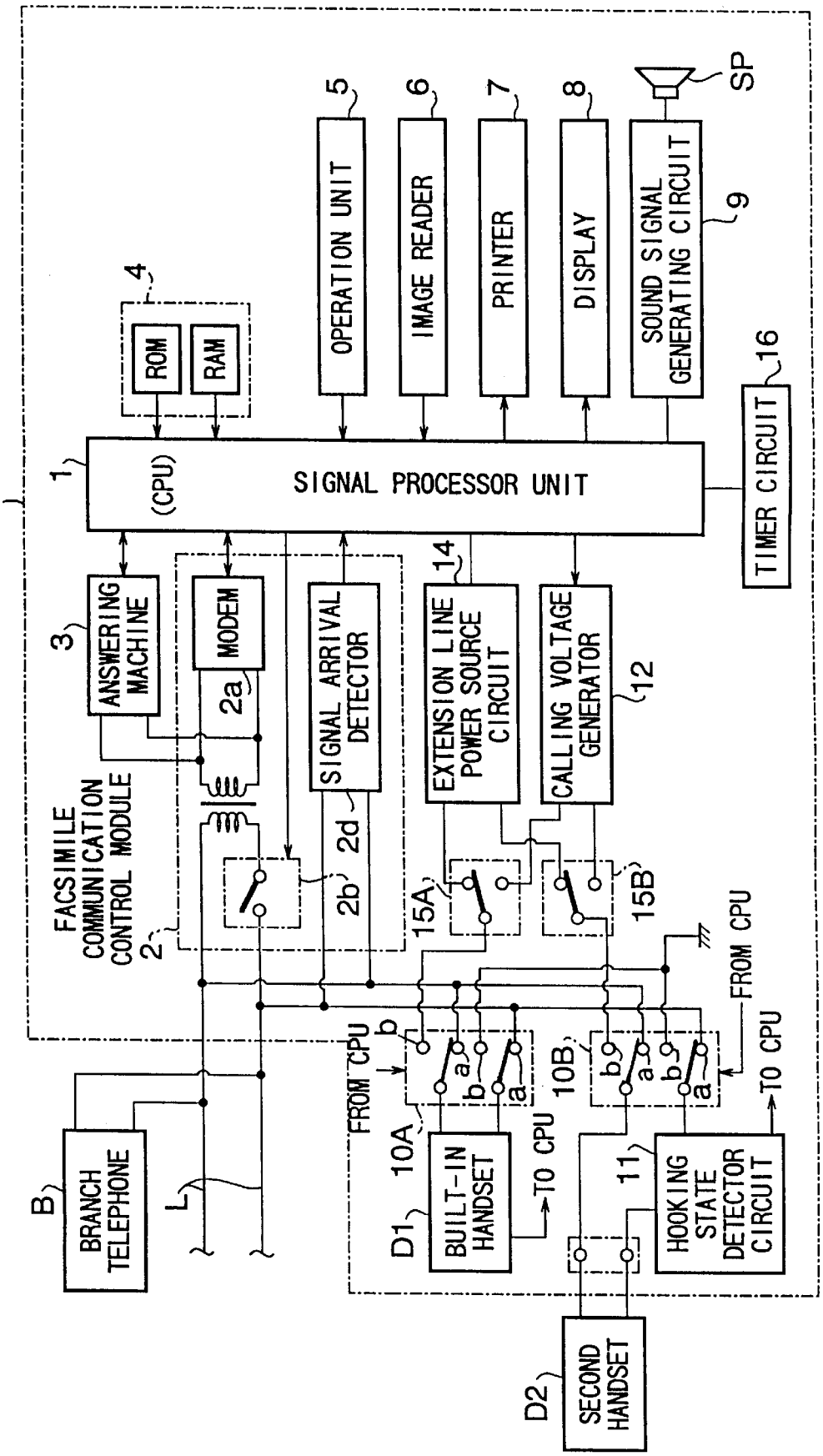
FIG. 1 is a block diagram of a hardware of a facsimile apparatus according to a first embodiment of the present invention.

Now, preferred embodiments of the present invention will be described with reference to the accompanying drawings.

Referring to FIGS. 1 to 6, a first embodiment will be described.

"F" designates a facsimile apparatus according to the present invention which is shown to include a signal processor unit 1, that is constituted by a CPU in the illustrated embodiment and referred to as "control means" in the claims, a facsimile communication control module 2, an answering machine module 3, a memory unit 4 constituted by a ROM and a RAM, an operation unit 5 having various keys and switches, an image reader 6 for scanning and reading image on a sheet, a printer 7 for printing image data on a recording sheet, a display 8 having a liquid crystal display or the like, a sound signal generating circuit 9 for generating a buzzer sound to inform the operator of a certain occurrence, a speaker set SP and a timer circuit 16.

These elements are connected with each other via the signal processor unit 1.

The facsimile communication control module 2 includes a modem 2a for receiving/transmitting image data from/to outside, a relay switch 2b for connecting/disconnecting the modem 2a with/from a communication line (trunk) L and for generating a dial pulse for dialing (for making a call to outside) and a signal arrival detector 2d for detecting a ringing signal (bell signal) of 16 Hz transmitted from a line switching device. A so-called branch telephone B may be connected in parallel with the communication line L.

A built-in handset D1 is connected with the communication line L via a relay switch 10A and a second handset D2 is also connected with the communication line L by way of another relay switch 10B and a hooking state detecting circuit 11.

The built-in handset D1 and the second handset D2 can call a remote third party and can be called from such a party respectively if the relay switches 10A and 10B are closed to contacts "a" respectively. On the other hand, if contacts "b" of the relay switches 10A and 10B are closed, the built-in handset D1 and the second handset D2 are connected with the extension line power source circuit 14. If relay switches 15A and 15B are switched to a ringing voltage generator 12 from the extension line power source circuit 14, it is possible to send a ringing signal to the built-in handset D1 or the second handset D2 for extension-line conversation.

On and off hooking of the second handset D2 is detected by the hooking state detector circuit 11, and an output signal of the detector circuit 11 is fed to the signal processor unit 1. On the other hand, an element like the hooking state detecting circuit 11 is not used for the built-in handset D1 incorporated in the facsimile apparatus F. A signal representative of on or off of a hook switch of the built-in handset D1 is directly inputted to the signal processing unit 1.

The signal processor unit 1 controls switching operations of the relay switches 10A, 10B, 15A and 15B based on a stand-by mode selected by manipulation of the operation unit 5 by a user. Specifically, if the facsimile apparatus in a stand-by condition is set to a dial-in mode (direct inward dialing mode) which should perform a silent (no-ringing) signal-reception or a telephone/facsimile mode, the relay switch 10B is closed to the contacts "b" and the second handset D2 is disconnected from the communication line L (which allows conversation by way of the extension line).

If the facsimile apparatus is set to a mode other than above, the relay switch 10B is closed to the contacts "a" and the second handset D2 is connected with the communication line L (this allows conversation with a remote third party through the communication line L).

The answering machine 3 has a voice memory (not shown) and a voice synthesizer circuit (not shown) for sending a predetermined voice message to a calling party and recording a voice from the calling party. The answering machine 3 is connected with the communication line L in parallel to the modem 2a. Tt should be noted that the answering machine 3 is adapted to not only retrieve the recorded voice message for the calling party but also transmit another voice message to the built-in handset D1 and/or the second handset D2 to notify arrival of a call from outside.

The operation unit 5 includes a ten-key set and other common operation keys as well as a mode selection switch for setting a stand-by mode of the facsimile apparatus F. With the operation unit 5, the user can select a facsimile signal reception mode which gives priority to reception of a facsimile signal, a telephone mode which gives priority to reception at the built-in or second handset, a telephone/facsimile mode for automatically performing switching between handsets and a facsimile module or an answering machine mode for automatically performing switching between the answering machine and the facsimile module.

The signal processing unit 1 controls operations of the above-described elements and processes various signals to selectively perform a facsimile signal reception, communication line conversation using the handset D1) or D2 and extension line conversation using the handsets D1 and D2.

If a ringing signal of 16 Hz, which is transmitted from a line switching device, is detected by the signal reception detecting unit 2d while the conversation is being had between the two handsets D1 and D2, the signal processor unit 1 performs the following operations depending on the stand-by mode as selected by the user who manipulates the operation unit 5.

If the facsimile signal reception mode is chosen, the relay switches 10A and 10B are closed to the contacts "a" and the relay switch 2b is turned on to connect the mode 2a and associated elements with the communication line L for reception of a facsimile signal. Upon reception of an initial signal, the facsimile signal reception is initiated (for example, a DIS signal is transmitted onto the communication line L from the modem 2a for preparation of facsimile signal reception.).

At this point, the relay switches 10A and 10B are both switched to the contacts "b" so that the connection between the handsets D1 and D2 and the communication line L is interrupted.

On the other hand, if the facsimile apparatus F is set to a mode other than above, e.g., to a telephone mode or a telephone/facsimile mode, the relay switch 2b is turned on and the signal processor unit L causes the answering machine 3 to produce (or play) a voice message (for example, "There is a call from outside."), which is transferred to the built-in handset D1 and the second handset D2, respectively.

After a certain period, the signal processor unit 1 appropriately switches the relay switches 10A, 10B and the switch 2b such that one of the handsets D1 and D2 which is still off hooked is connected with the communication line L.

Specifically, if both of the handsets D1 and D2 are on hooked together and then the built-in handset D1 is only off hooked again, the off hooked handset D1 is connected with the communication line L. If the second handset D2 is only on hooked while a conversation is being had between the handsets D1 and D2, then the built-in handset D1, which is maintained in an off hooked state, is only connected with the communication line L.

If both the handsets D1 and D2 are on hooked and neither handset is off hooked again, then these handsets D1 and D2 may be connected with the communication line L to allow so-called "add-on".

Now, operations and functions of the facsimile apparatus F will be described.

In a certain occasion, the user may want to give priority to facsimile signal reception rather than reception at the handset D1/D2 for a call from outside. In this case, the facsimile apparatus F is set to the facsimile signal reception mode.

In such a mode, if a call arrives at the facsimile apparatus F from outside and a ringing signal is sent from the line switching device while a conversation is being had between the built-in handset D1 and the second handset D2, the ringing signal is detected by the signal arrival detector 2d and the modem 2a and associated elements are connected with the communication line L for conversation with the remote calling party. After that, like an ordinary facsimile apparatus, a handshake is conducted and a facsimile message is appropriately received by the facsimile apparatus F if the calling party is a facsimile machine.

Even during the facsimile message reception, the handsets D1 and D2 are connected with each other by the extension line so that users of the handsets D1 and D2 can continue their conversation. Therefore, unlike the conventional apparatus, it is not necessary to interrupt the conversation.

If the calling party is a person and sends a voice, the facsimile signal reception cannot take place and it results in a "facsimile communication error". However, the user knows that this error should occur since he has set such a mode (facsimile signal reception mode).

If the facsimile apparatus F is desired to be used for both conversation and facsimile signal reception, a mode other than the facsimile reception mode should be selected.

In this case, if a call arrives at the facsimile apparatus F from outside while a conversation is being held between the two handsets D1 and D2, the answering machine 3 sends a voice message such as "Call from outside" to the handsets D1 and D2, which is heard by the handset users respectively. Therefore, the users can know that someone is calling from outside. A user who does not want to talk with the calling party may on hook his handset. Then, the other user will have a conversation with the calling party. Alternatively, the users may on-hook their handsets and one of them who off hooks the handset again may be allowed to speak to the calling person.

In either case, the off-hooked handset D1 or D2 is connected with the communication line L so that a conversation is permitted if the third party is a person.

Figure 2:
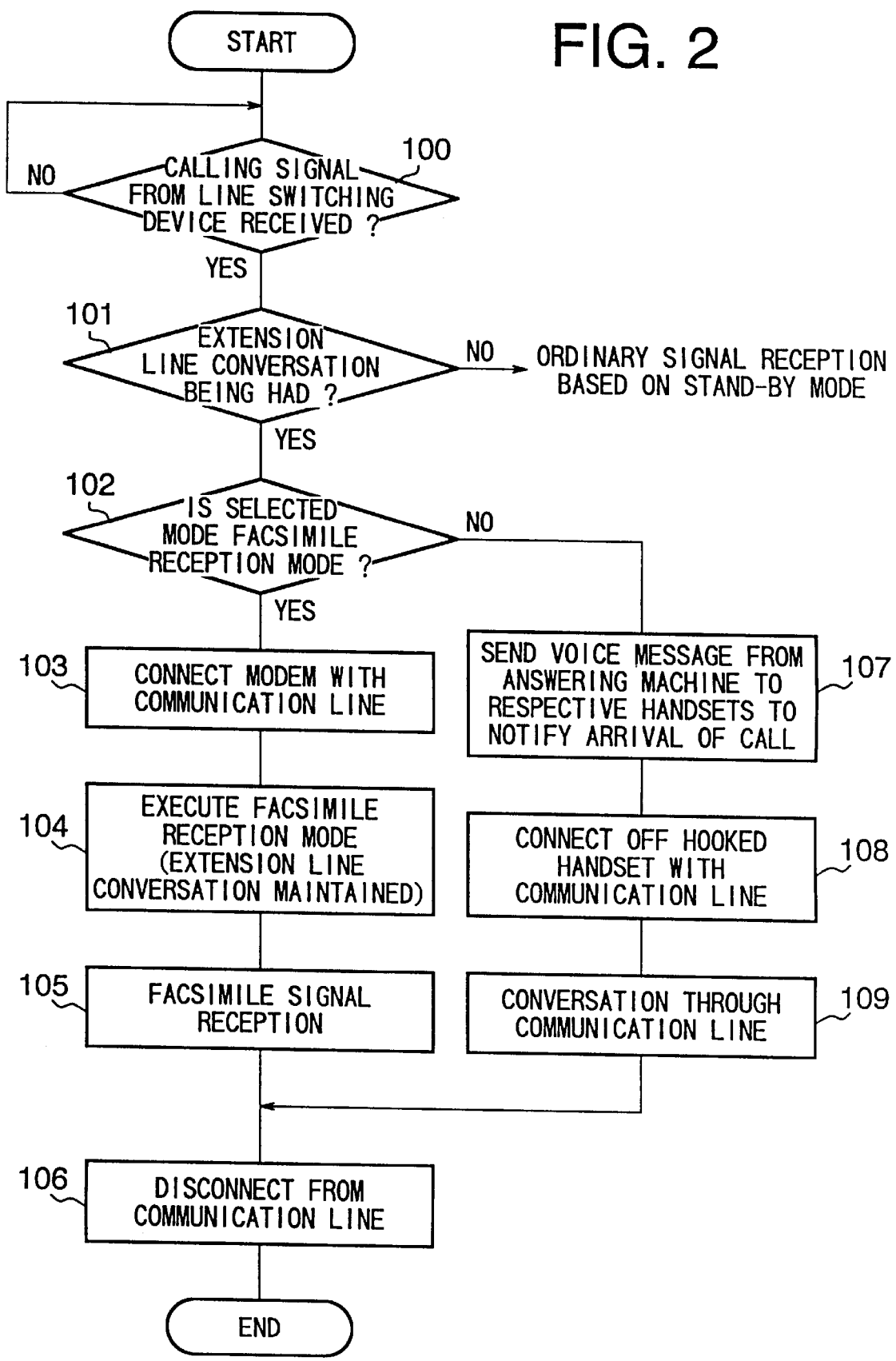
FIGS. 2, 3 and 4 illustrate flowcharts which describe operations of the facsimile apparatus shown in FIG. 1, respectively.

Referring to FIG. 2, steps 100 to 109 indicate the above-described operations of the facsimile apparatus F.

In the foregoing, a predetermined voice message is transmitted to the handsets D1 and d2 from the answering machine 3 to inform the handset users of the arrival of a call from outside. However, the present invention is not limited to this. For example, a voice message may be provided from another element and a tone signal (DTMF) or the like may be given to the handsets D1 and D2 instead of the voice message.

Next, a stand-by condition switching operation will be described.

If the user manipulates a certain key of the operation unit 5 to select the telephone/facsimile mode, the relay switch 10B is closed to the contacts "b" and the handsets D1 and D2 are disconnected from the communication line L as long as the facsimile apparatus F is in a stand-by condition in which neither telephone conversation nor facsimile signal reception is performed, as illustrated in FIG. 1.

In this stand-by condition, even if a call comes from outside to the facsimile apparatus F and a ringing signal is sent from the line switching device, the ringing signal is not received by the second handset D2. Therefore, the second handset D2 does not ring while a facsimile signal is being automatically received at the facsimile communication control module 2. As a result, eliminated is a possibility or undesired situation that the second handset D2 is accidentally picked up prior to the automatic facsimile signal reception at the facsimile communication control module 2.

Of course, the built-in handset D1 is inhibited to ring in this situation.

If the facsimile apparatus F in the stand-by condition is set to the dial-in mode, the built-in handset D1 and the second handset D2 are not connected with the communication line L but connected with each other by the extension line. Therefore, the handsets D1 and D2 do not ring before the ringing signal from the line switching device is received twice and an automatic reception is carried out at the modem 2a.

If the built-in handset D1 and/or the second handset D2 is off-hooked prior to the automatic reception at the modem 2a, the dial-in service is no longer provided. However, the illustrated facsimile apparatus F prevents the handsets D1 and D2 from ringing in response to the call from the line switching device so that such an inconvenience never occurs.

If a user wishes to make a call to outside from the second handset D2, he/she may dial "0 (zero)". Then, a dial pulse is detected by the hooking state detector circuit 11 and the relay switch 10B is switched to the contacts "a" so that the second telephone D2 is connected with the communication line L. If a user wants to call a remote party from the built-in handset D1, the built-in handset D1 is off hooked. This off hooking is detected by the hook switch and the relay switch 10A is switched to the contacts "a".

On the other hand, if a mode which does not require a no-ringing signal-reception is selected (e.g., a telephone mode), the relay switch 10B is closed to the contacts "a" and the handsets D1 and D2 are both connected with the communication line L.

In this situation, the ringing signal, from the line switching device is received by the built-in handset D1 and the second handset D2. Thus, these handsets ring in response to the call from outside to notify the users of the arrival of the call.

If the second handset D2 is already connected with the communication line L when the user of the second handset D2 wants to make a call, no special switching operations are necessary to connect the second handset D2 with the communication line L. Therefore, if the facsimile apparatus F of the present invention is set to a mode to which the silent (non-ringing) signal-reception is not expected, no special operations and controls are required for connection between the second handset D2 and the communication line L to allow the user to make a call from the second handset D2.

Figure 3:
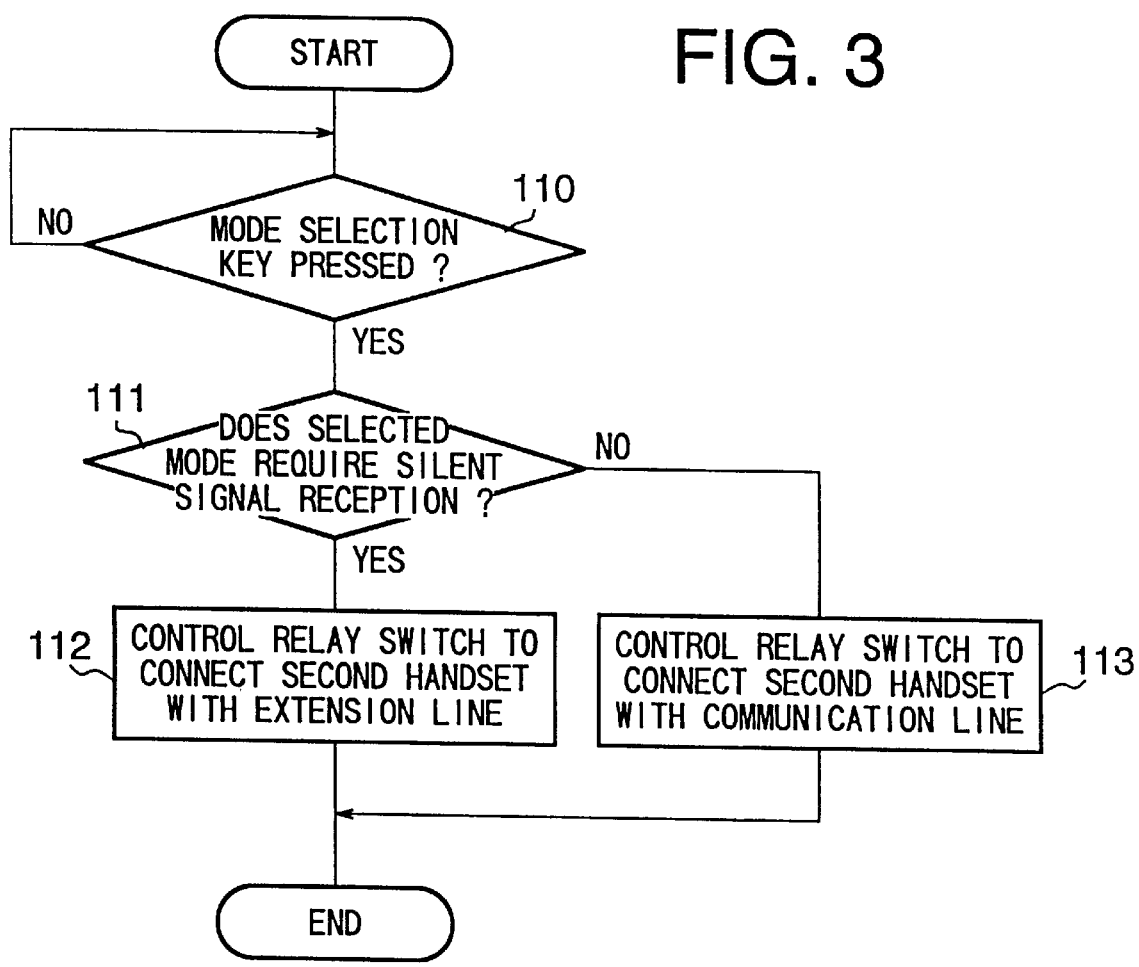

Steps 110 to 113 in the flowchart illustrated in FIG. 3 shows operations of the signal processor unit 1.

In the foregoing, the dial-in mode and the telephone/facsimile mode are employed as the stand-by mode which requires silent signal reception. However, this does not limit the scope of the present invention. For example, whether the silent signal reception is expected or not is determined by a manufacture or a user.

In addition, the line control for the handsets and the facsimile communication control module is not necessarily performed by the signal processing unit 1 and the relay switches 10A, 10B, 15A and 15B. A specific control is not limited to the one described above.

Figure 5:
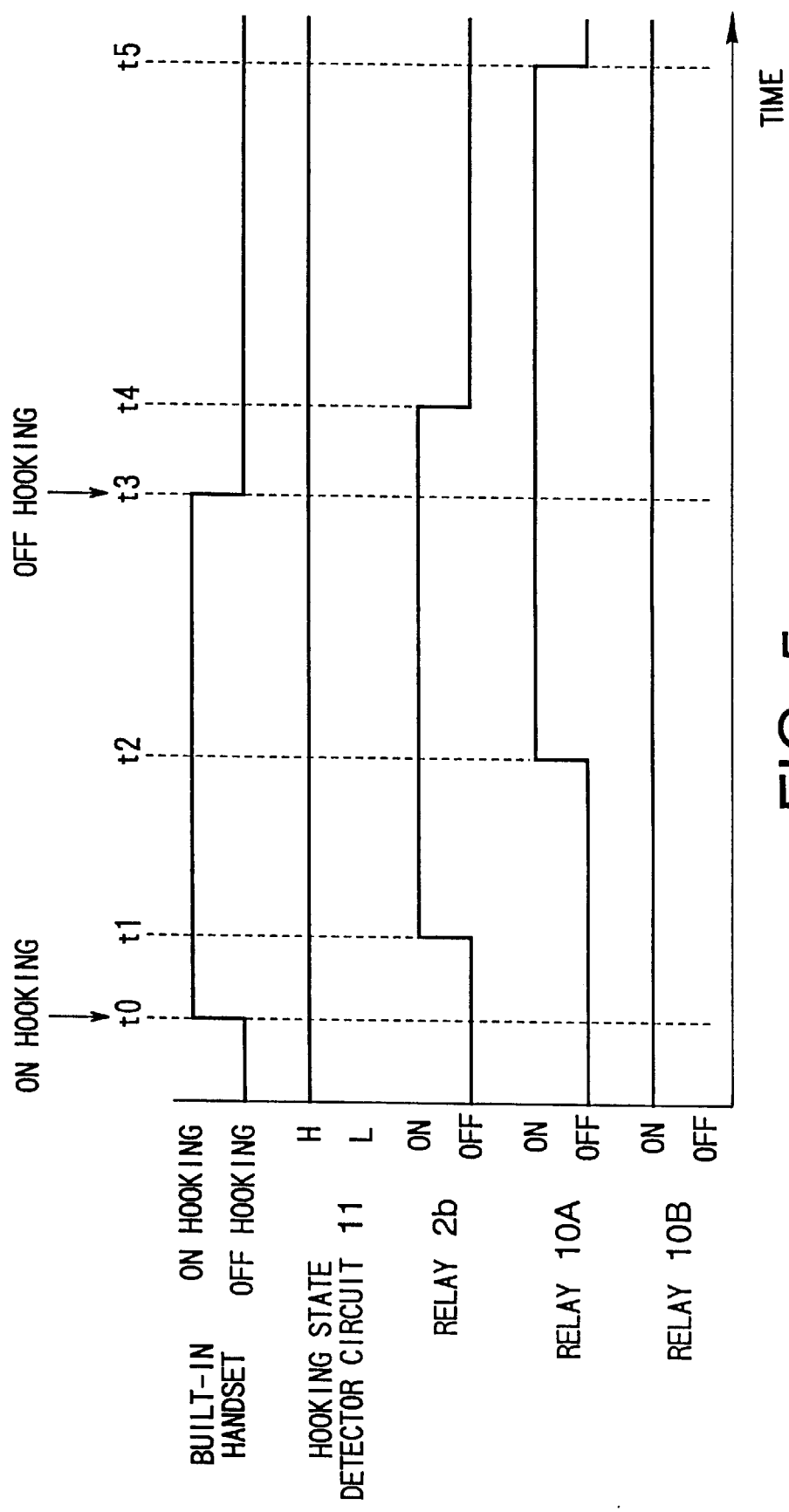
FIGS. 5 and 6 depict timing charts of the facsimile apparatus shown in FIG. 1, respectively.
Figure 6:
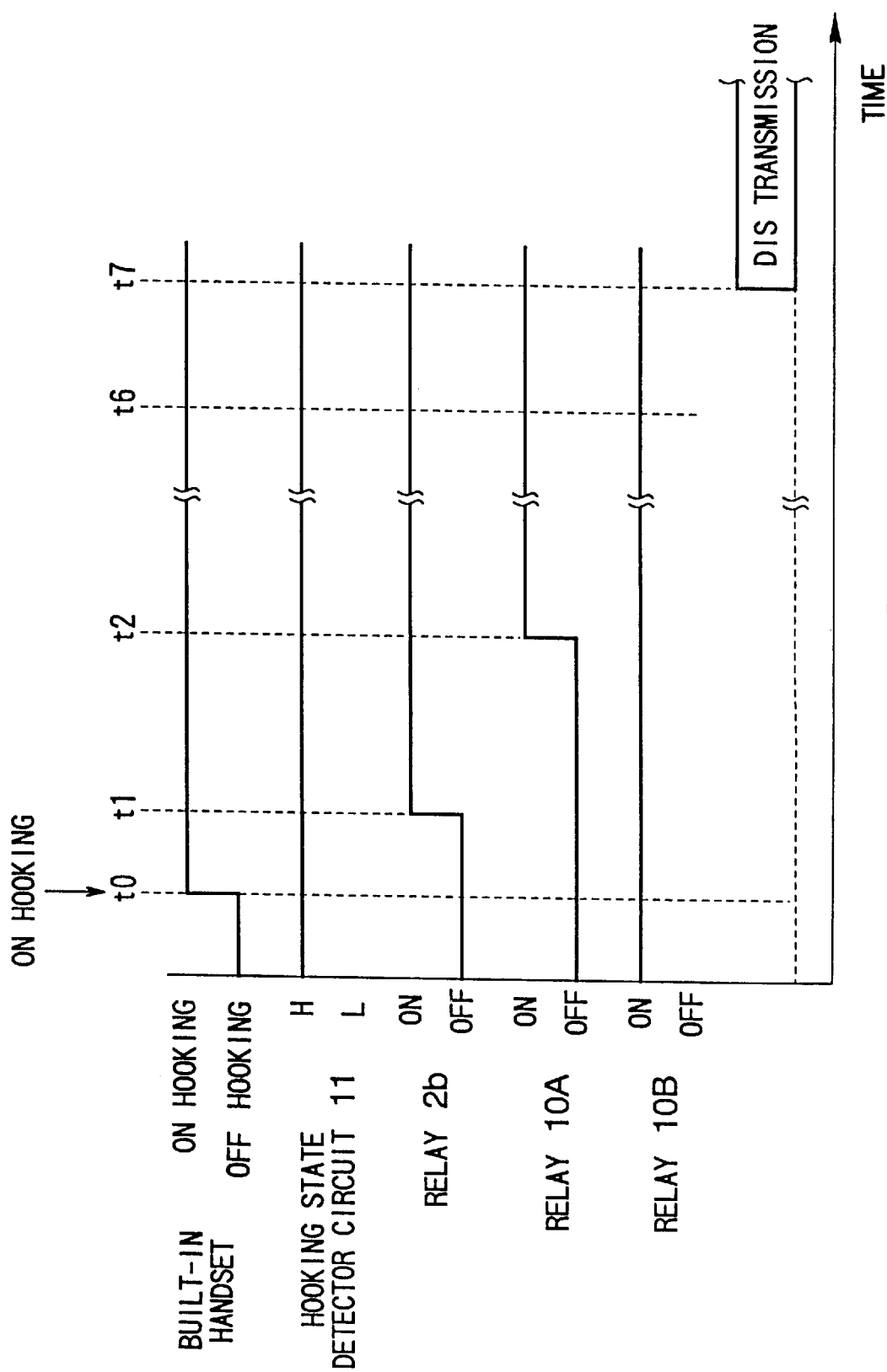

Next, hooking operation of the facsimile apparatus F will be described with reference to FIGS. 4 to 6.

Here, it is supposed that the user of the handset D1 is talking with a remote third party. In this case, the handset D1 is off hooked, the second handset D2 is on hooked, the relay 26 is turned off, the relay 10A is turned off, the relay 10B is turned on and the built-in handset D1 is connected with the communication line L, as illustrated in FIG. 5. In FIG. 5, the relays 10A, 10B and 2b are shown in off conditions, respectively. If a sound signal of call waiting service is sent to the handset D1 from the line switching device through the line L the user of the handset D1 on hooks the handset D1 to change the party to talk with. This time is indicated by "t0" in FIG. 5. A signal representative of the on hooking of the handset D1 is inputted to the signal processor unit 1. Accordingly, the signal, processor unit 1 activates the timer circuit 16 to start counting the time. Then, the signal processing unit 1 turns on the relay 2b at a time t1 and the relay 10A at a time t2. Upon turning on of the relay 26, the modem 2a is connected with the line L, and turning on of the relay 10A causes the handset D1 to be disconnected from the line L. However, no response signal is sent back to the calling party from the modem 2a.

If the user of the built-in handset D1 off hooks the handset D1 before a predetermined time set by the timer 16 elapses, e.g., at a time t3, a detection signal is outputted to the signal processing unit 1. Upon receiving this signal, the signal processor unit 1 turns off the relay 2b at a time t4 and the relay 10A at a time t5. Turning off of the relay 2b results in disconnection of the modem 2a from the line L and turning off of the relay 10A results in connection of the handset D1 with the line L. This is the hooking operation. Also, the handset D1 is connected with the line L. Therefore, the built-in handset D1 is connected with a remote telephone (not shown) through the communication line L after the time t5 so that the user of the handset D1 is now able to communicate with the remote third party. The length between the time t4 and the time t5 is determined such that there is a sufficient time for the line switching device to confirm that the hooking operation has taken place.

On the other hand, if there is a call to initiate a facsimile communication from a remote facsimile machine but the user of the handset D1 off hooks the handset D1 before the facsimile apparatus F starts the automatic reception, a facsimile signal is transferred to the handset D1. Upon hearing this signal, the user of the handset D1 on hooks his handset D1. This time is indicated as "t0" in FIG. 6. Operations between the time t0 and a time t2 or operations between step 120 and step 122 of FIG. 2 are the same as described above. However, since the handset D1 is on hooked, the handset D1 is not off hooked even if the timer 16 counts a time t6 (t6 is a time limit set by the timer). In other words, even after a predetermined period after the on hooking of the handset D1, the handset D1 is not off hooked so that the signal processing unit 1 initiates the facsimile reception and an identification signal DIS is transmitted to the line L from the modem 2a at a time t7. Therefore, the facsimile apparatus F appropriately starts the facsimile reception. If the user off hooks the handset D1 again prior to completion of transmission of DIS, the signal processor unit 1 judges that the user has off hooked the handset for a next call, so that it stops the transmission of DIS.

In this manner, the on hooking of the handset D1, for example, which is connected with the communication line L extending to the facsimile communication control module 2 disconnects the handset D1 from the communication line L and initiates the facsimile reception. Further, if the handset D1 is off hooked within a predetermined period after the on hooking, the hooking operation to the line L is conducted. In other words, the signal processor unit 1 causes the handset D1 to return to the original situation regarding the line connection. Therefore, if a sound signal of call waiting service is heard while the user of the handset D1 is talking to someone, the user is only required to on hook the handset D1 first and then off hook the handset within the predetermined period. This operation by the user causes the signal processor unit 1 to control the relays 10a and 26 and return the handset D1 to the original line connection condition, which results in the hooking to the line L. Consequently, the call waiting service is appropriately performed and the user can talk to a new party. If a call from outside is for facsimile communication but the user off hooks the handset D1, the user is only required to on hook the handset. As this on hooking state of the handset D1 continues for a predetermined period, the signal processor 1 starts the facsimile signal reception. Therefore, if the user of, for example, the handset D1 which is connected with the same communication line L as the facsimile apparatus F on hooks the handset D1 for the call waiting operation while he/she is talking to someone through the handset D1, the facsimile signal reception is not performed accidentally and the talking party change by the call waiting service is appropriately conducted.

Figure 4:
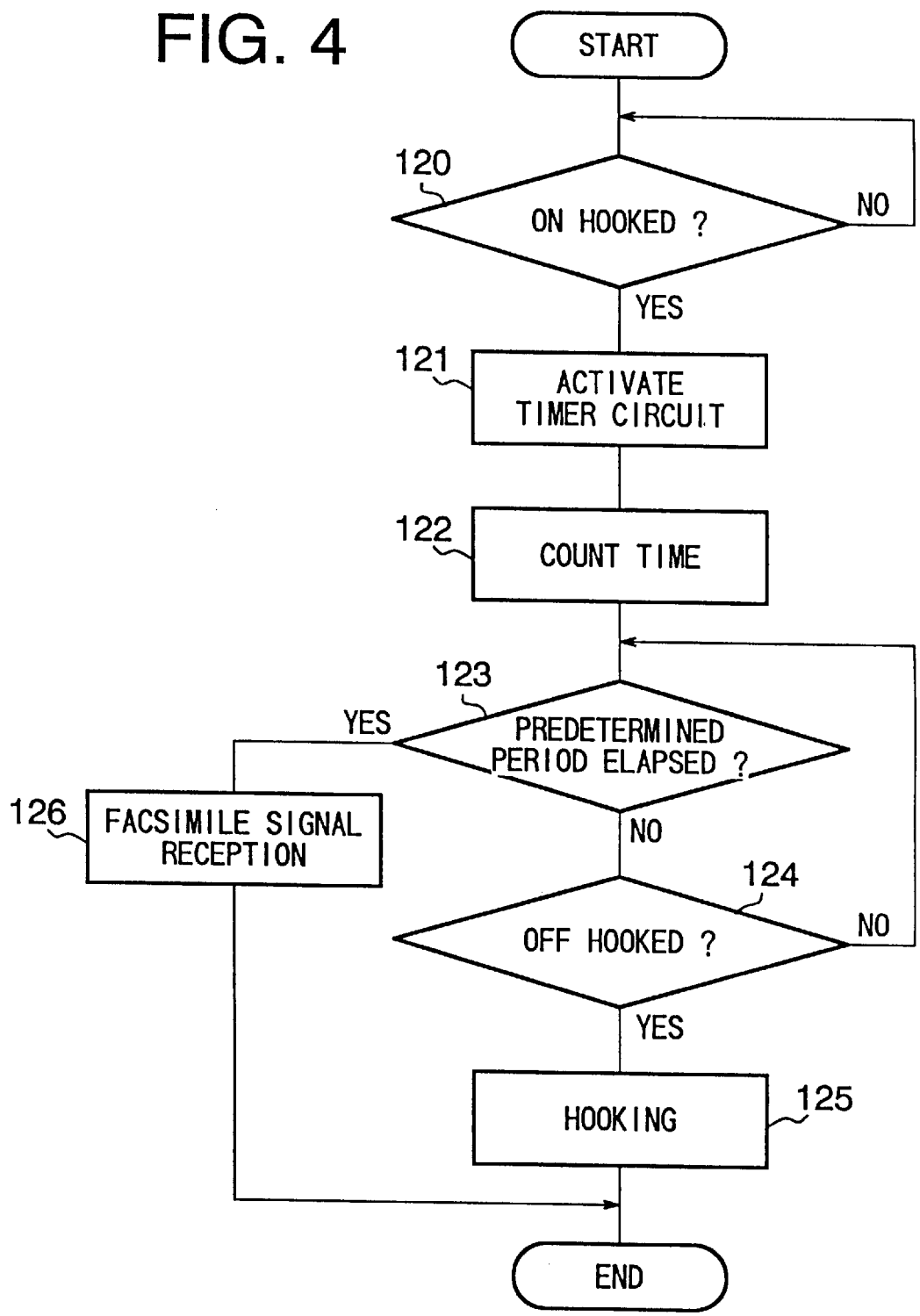

Steps 120 to 26 of the flowchart illustrated in FIG. 4 show the above-described operations of the facsimile apparatus F.

The predetermined period set by the timer circuit 16 can be determined depending on various design factors such as operationability as long as it does not affect the signal reception of the facsimile apparatus F.

Although the foregoing deals with an example in which the handset D1 is used for the conversation and an example in which the handset D1 is off hooked, the same can be said for a case where the second handset D2 is used for the conversation and off hooked except for that the relay 10B is employed instead of the relay 10A.

Figure 8:
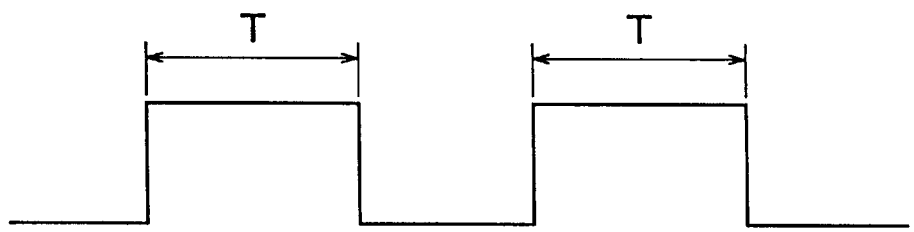
FIGS. 8 and 9 illustrate waveforms of dial pulses concerned with the second embodiment of the present invention.
Figure 9:
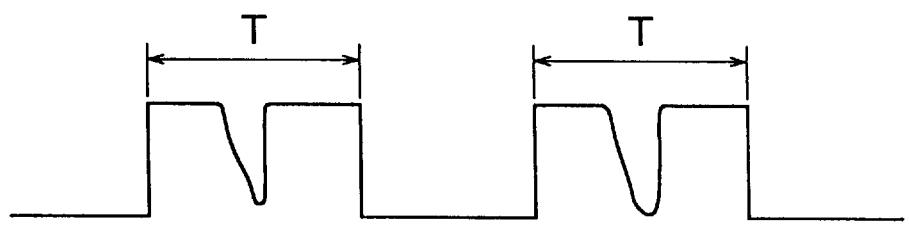
Figure 10:
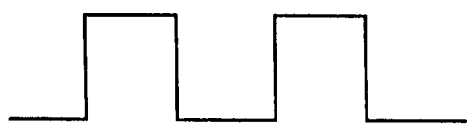
FIGS. 10 and 11 depict dial pulse waveforms in a conventional facsimile apparatus.
Figure 11:
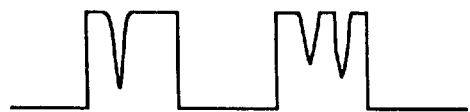

Now, a second embodiment of the present invention will be described referring to FIGS. 7 to 9.

Figure 7:
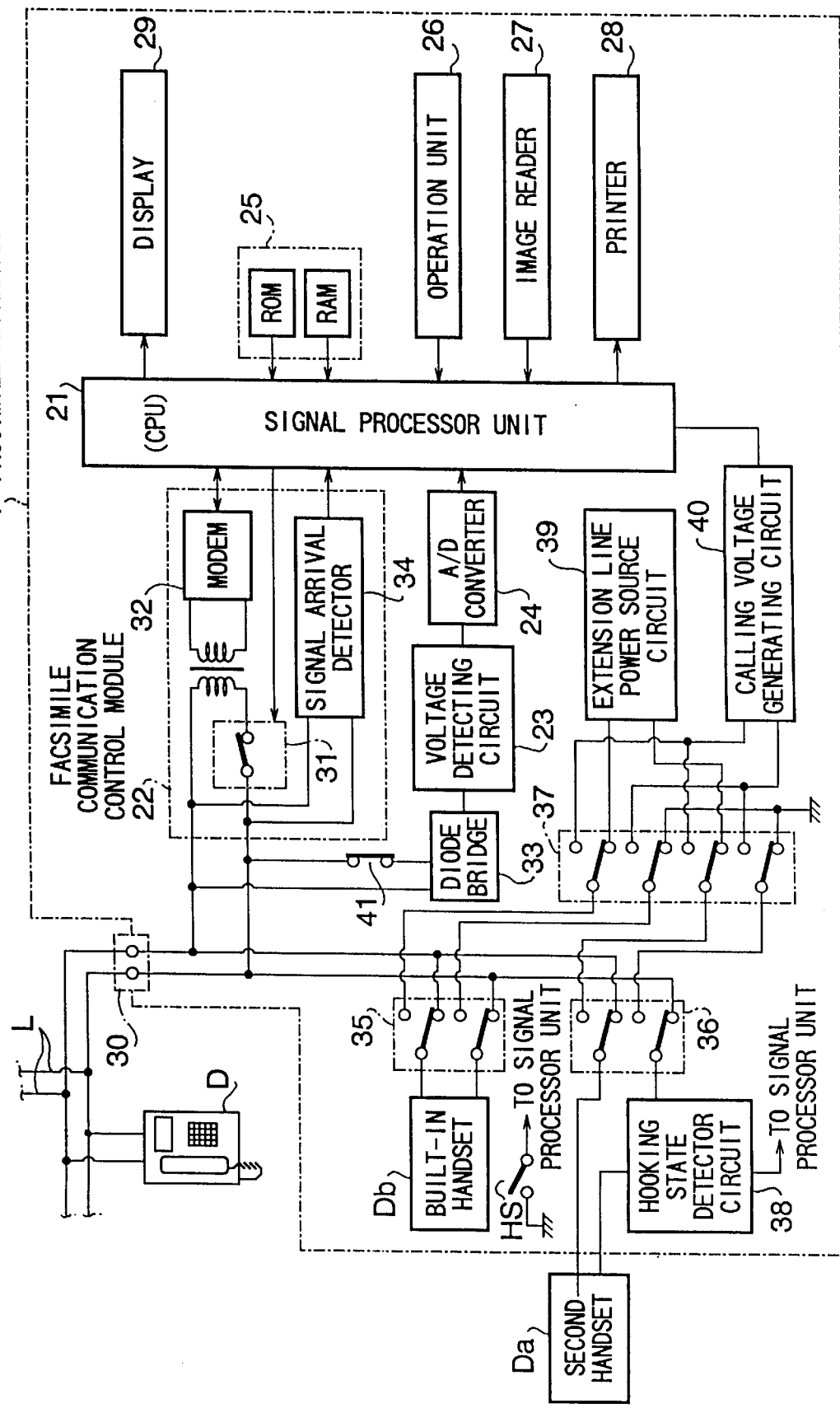
FIG. 7 is a block diagram of a facsimile apparatus according to a second embodiment of the present invention.

In FIG. 7, a facsimile apparatus F of the present invention includes a signal processor 21, a facsimile communication control module 22, a voltage detecting circuit 23, an A/D converter 24, a memory 25, a key operation unit 26, an image reader 27, a printer 28, a display 29, a modular jack 30, a diode bridge 33, relays 35, 36, 37 and 41, a power source circuit for an extension line 39 and a voltage generating circuit for calling 40. The facsimile communication control module 22 includes a relay 31, a modem 32 and a signal arrival detector 34. The facsimile apparatus F is connected with a line L and a branch telephone D is also connected with the line L.

The signal processing unit 21 includes a CPU and other elements to constitute a pulse detecting means, a hooking state detection means and other means for overall control of the facsimile apparatus F. For example, a digital signal from the A/D converter 24 is used in determining the number of the dial pulses from the branch handset D. Further, the hooking state of the branch handset D is determined (or detected) also based on a digital signal from the A/D converter 24.

The facsimile communication control module 22 controls communication between the facsimile apparatus F and a remote communication terminal, via a line switching device. The diode bridge 33 adjusts polarity of inputted currents and outputs currents having a predetermined polarity to the voltage detection circuit 23. The voltage detection circuit 23 detects the voltage of the line L and outputs an analog signal corresponding to the line voltage to the A/D converter 24. The A/D converter 24 samples analog signals from the voltage detection circuit 23 at predetermined periods, converts them into digital signals and inputs them to the signal processing unit 1 as voltage data. Thus, the diode bridge 33, the voltage detecting circuit 23 and the A/D converter 24 constitute an A/D converter means.

The memory 25 includes a ROM, a RAM and other parts to store various programs and data. The key operation unit 26 includes a ten-key set and other operational keys and inputs an operational signal to the signal processing unit 1 upon manipulation by a user. The image reading unit 27 scan-reads image data on a sheet such as characters, lines and drawings. The printer unit 28 prints image data on a recording sheet. The display unit 29 provides various visual information for the user. The modular jack 30 connects the facsimile apparatus F with the line L. On and off of the relay 31 are controlled by the signal processing unit 21. In the on condition, the relay 31 connects the line L with the modem 32. The modem 32 receives/transmits image data or the like. The call arrival detector 34 detects arrival of a call from outside.

A built-in handset Db and a second handset Da are also connected with the line L via relays 35 and 36. The relay 35 selectively connects the built-in handset Db with the line L or a relay 37 upon switching operation. Likewise, the relay 36 selectively connects the second handset Da with the line L or the relay 37. These relays 35 and 36 are controlled by the signal processing unit 21. A hook switch HS detects off hooking of the built-in handset Db. The hooking state detection circuit 38 detects off hooking of the second handset Da. The hooking state detection circuit 38 includes a photocoupler or the like.

Upon switching operation, the relay 37 connects the built-in handset Db and the second handset Da with either the extension line power source circuit 39 or the call voltage generating circuit 40. When the built-in handset Db and the second handset Da are connected with the extension line power source circuit 39, a user of the handset Db and a user of the other handset Da can talk with each other through the extension line. The call voltage generating circuit 40 generates a call voltage to drive ringers of the handsets D*b* and B*a*.

Next, major operations or the facsimile apparatus F will be described. The following deals with a case where the branch telephone D and the facsimile apparatus F are in on hooked conditions respectively, and a voltage of the line L is about 48 V. First, the voltage detecting circuit detects the voltage of the line L and outputs an analog signal corresponding to the line voltage to the A/D converter 24. Then, the A/D converter 24 samples analog signals from the voltage detection circuit 23 at the predetermined periods, converts them into digital signals and inputs them to the signal processing unit 21 as the voltage data. For example, using a buffer memory for holding a prescribed number of voltage data, a latest voltage average is calculated from a predetermined number of voltage data upon input of new voltage data. This average is taken as a current or updated line voltage by the signal processing unit 21.

If the branch telephone D is off hooked, the voltage of the line L drops to about 10 V and the average of the voltage data rapidly decreases. With this voltage change, the signal processing unit 21 notices that the branch telephone D is off hooked. Even if the voltage of the line L is lower than 48 V due to installation conditions such as a long distance to a central telephone exchanger, the signal processing unit 21 can accurately judge the off hooking of the branch telephone D since the off hooking is determined based on the voltage change. The line voltage is also lower than 48 V when the modem 39 is connected with the line L. In this case, the line voltage change upon on and off hooking of the branch telephone D becomes smaller. In this embodiment, however, detection of the line voltage depends on a resolution of the A/D converter 24 so that the signal processing unit 21 is able to correctly determine the on and off hooking of the branch telephone D. Likewise, if the built-in handset D*b* and/or the second handset D*a* is connected with the line L, the signal processing unit 21 accurately judges the on and off hooking of the branch telephone D.

As a user of the branch telephone D dials, dial pulses of which number corresponds to a dialed number are outputted onto the line L. Accordingly, the voltage of the line L rises during on-periods of the dial pulses. In this case, if the dial pulses have no crackings as illustrated in FIG. 8, the voltage data of the dial pulses during the on-periods T have a constant raised value so that it is possible to precisely detect the number of the dial pulses. It should be noted that even if the dial pulses have crackings as illustrated in FIG. 93, accurate detection of the number of the dial pulses is also feasible by appropriately processing the voltage data. For instance, at Least one voltage data is lower than another voltage data during the on-period T in FIG. 9. However, the length of the pulse period (cycle) is generally 20 pps or 10 pps and this value does not change. Also, the on-time T is constant. Therefore, if the sampling period of the A/D converter 24 is set to be sufficiently smaller than that of the on-time T of the dial pulse, some lowered voltage data during the on-time T does not affect the counting of the number of the pulses. Thus, the pulse having a crack shown in FIG. 9 is counted one. The off-period of the dial pulse is also constant so that the crackings of the pulses are not taken as the off-periods of the pulses.

In this manner, the voltage of the line L is digitized by the voltage detection circuit 23 and the A/D converter 24 and the digitized voltage signals are processed in the signal processing unit 21. Consequently, the number of the dial pulses from the branch telephone D are always detected correctly even if the dial pulses are deformed and have crackings, and the hooking state of the branch telephone D is also detectable. When a call is sent to outside from the facsimile apparatus F, the relay 31 is opened and closed to generate dial pulses. To avoid that these dial pulses are fed to the A/D converter 24, the signal processing unit 21 turns off the relay 41 during generation of the dial pulses.

The foregoing description deals with a case where the dial pulses from the branch telephone D are detected, but the present invention is not limited to this. For example, the dial pulses from the second handset D*a* connected with the facsimile apparatus F via the modular jack are also accurately detectable in a similar manner.

Now, a third embodiment of the present invention will be described referring to FIG. 12.

Figure 12:
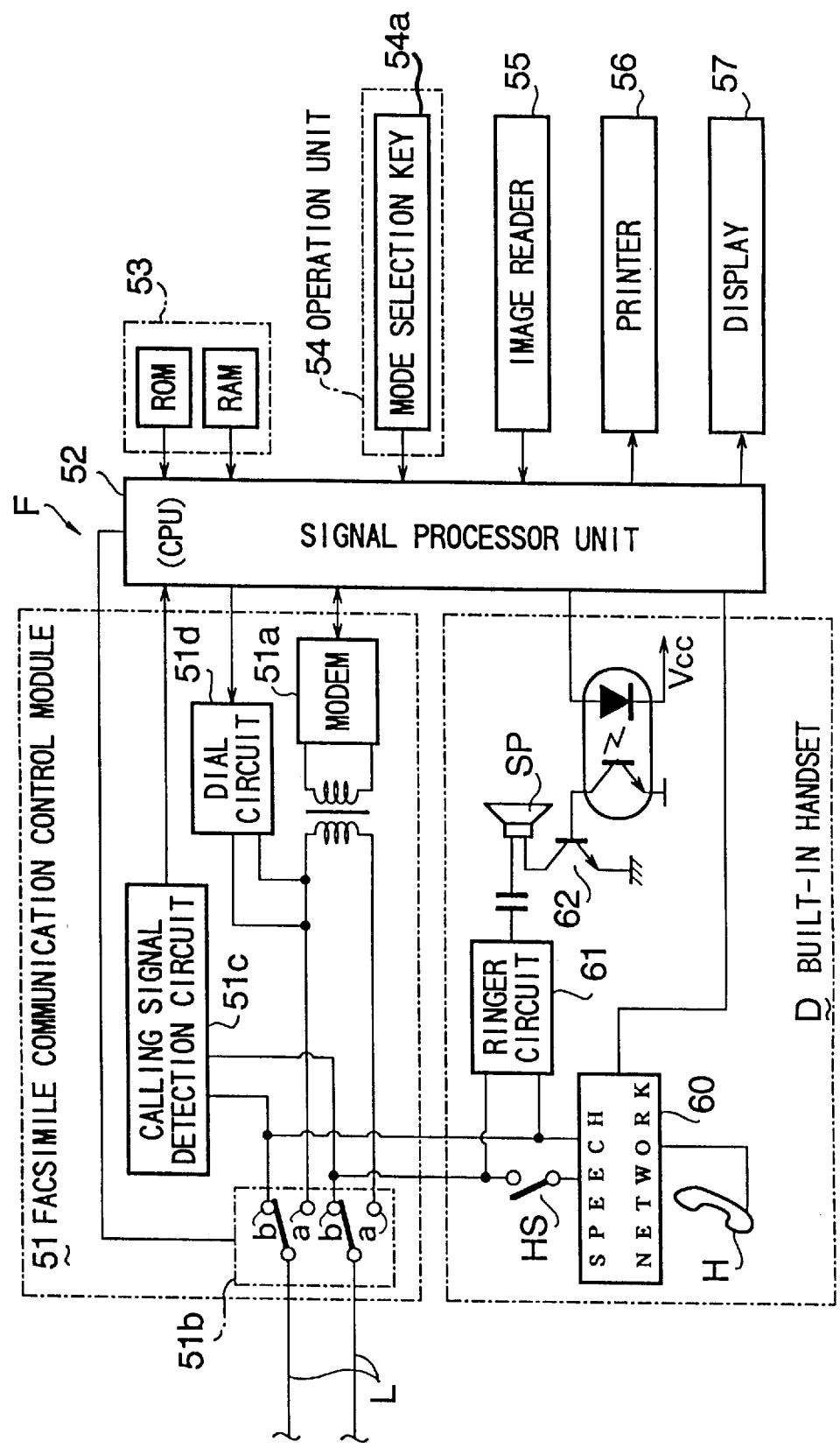
FIG. 12 is a block diagram of hardware of a facsimile apparatus according to a third embodiment of the present invention.

In FIG. 12, depicted is a block diagram of a facsimile apparatus F including a built-in handset D connected with a communication line L. The facsimile apparatus F also includes a facsimile communication control module 51 connected with the communication line L for facsimile communication with a remote facsimile machine. The facsimile communication control module 51 and the built-in handset D are controlled by a signal processing unit 52 which is constituted by a CPU and other components.

The facsimile communication control module 51 includes a modem 51*a* for transmission and reception of image data, a relay switch 51*b* for connection and disconnection of the modem 51*a* with and from the communication line L, a ringing signal detecting circuit 51*c* for detection of a ringing signal (16 Hz bell signal) transmitted from a line switching device, a dialing circuit 51*d* for transmission of dial pulses generated upon a dialing operation and other parts.

A memory unit 53 comprised of ROM and RAM, an operation unit 54 having a mode selection key 54*a* and other common operational keys, an image reader 55 for scan reading image on a sheet, a printer device 56 for printing image data on a recording sheet, a display 57 having a liquid crystal, display and other elements are connected with the signal processing unit 52.

A user can select a desired stand-by mode of the facsimile apparatus F by manipulating the mode selection key 54*a* of the operation unit 54. One of the available stand-by modes may be a telephone/facsimile mode in which a call from outside is silently (without ringing a bell or the like) accepted at the facsimile communication control module 51 when ringing signals from the line switching device are received at predetermined times, and then a facsimile communication procedure is initiated if a prescribed protocol signal such as a CNG signal is sent from the calling party whereas otherwise the built-in handset D is caused to ring to inform a user of arrival of a call from outside. In the present invention, this mode is a mode to which a silent signal reception is required.

Other stand-by modes may be a telephone mode in which priority is given to reception at the built-in handset D and a facsimile mode in which priority is given to facsimile reception. A silent reception is not expected to these modes in this particular embodiment.

The built-in handset D includes a speech network 60 for telephone conversation using a handset H, a ringer circuit 61 adapted to ring upon reception of a ringing signal from the line switching device, a speaker set SP and the like. The ringer circuit 61 always connects to the communication line L. The speech network 60 connects to the communication line L via a hook switch HS. When the user off hooks the handset H, the hook switch HS is turned on and the speech network 60 is connected with the communication line L. Between the ringer circuit 61 and the speaker SP, provided is a switching circuit 62. If a predetermined control signal is sent to the switching circuit 62 from the signal processing unit 52 through a photocoupler 63, a sound signal is not inputted from the ringer circuit 61 to the speaker SP side or grounded. Thus, a bell sound is not generated from the speaker SP.

The speaker SP, the ringer circuit 61 and the switching circuit 62 form a ringing means of the present invention.

The photocoupler 63 isolates the built-in handset D from the signal processing unit 52. Since the built-in handset D is powered by a current on the communication L, it should be isolated from the signal processing unit 52.

The signal processing unit 52 represents a control means of the present invention. If a user selects, using the mode selection key 54a, a stand-by mode to which a silent reception is expected such as a telephone/facsimile mode, the signal processing unit 52 continuously outputs a predetermined control signal to the switching circuit 62 of the built-in handset D. As a result, the speaker SP does not generate a bell sound.

Therefore, if a call arrives at the facsimile apparatus F from outside and a ringing signal is transmitted from the line switching device while the connection of the built-in handset D with the communication line L is being maintained, the facsimile communication control module 51 performs automatic facsimile reception without making any sounds.

In another mode to which the silent reception is not required, the signal processing unit 52 does not output any control signal to the switching circuit 62. Accordingly, upon a call to the facsimile apparatus F from outside, the built-in handset D is caused to ring.

In this embodiment, the stand-by mode to which the silent reception is require is the telephone/facsimile mode. However, the present invention is not limited to this. For example, the silent reception may be required to another stand-by mode. A manufacturer and/or a user may decide which mode should be a silent mode.

As understood from the above description, the present invention has various technical advantages over the prior art arrangements.

Unlike conventional faesimile apparatuses, the extension line conversation does not have to be interrupted when a call arrives from outside. If the facsimile reception priority mode is set, a facsimile reception is carried out while the conversation through the extension line is being maintained.

In addition, if a mode other than the facsimile reception priority mode is selected, a user of a handset having an extension line conversation can know of a call from outside. If a user maintains the off hooked state of the handset, he/she can directly talk to the calling party. Unlike conventional apparatuses, no troublesome operations are required in this situation.

Further, since the line voltage is converted to a digital signal prior to processing thereof, the hooking condition of the branch telephone is accurately detected under various circumstances. Particularly, by reducing the sampling period of the A/D converter means relative to the pulse width of the dial pulse from the branch telephone or the second handset, the number of the dial pulses can be counted correctly even if the dial pulses have crackings.

Moreover, since it is possible to switch from a belling reception (built-in handset is caused to ring at signal reception) to a silent reception and vice versa while the built-in handset is being connected with the communication line, a relay or the like for disconnecting the built-in handset from the communication line is not necessary. As a result, control for such a relay means is dispensed with and a manufacturing cost is also reduced.

Furthermore, since the built-in handset may be always connected with the communication line, various components associated with the built-in handset are always connected with the communication line. Therefore, it is possible to utilize these components effectively.

What is claimed is:

1. A fax machine, comprising:
    at least two handsets for enabling conversational communication with each other through extension lines,
    a facsimile communication control module,
    means for connecting the facsimile communication control module with a communication line when the fax machine is in a first mode in which operators of the at least two handsets are not informed of ringing signal reception and priority is given to reception of a fax signal even when the two handsets are engaged in conversational communication with each other through the extension line, conversational communication between the two handsets being maintained during connection of the facsimile communication control module with the communication line, and
    means for connecting at least one handset which is off hooked after the operators are informed of an arriving call from outside with the communication line when the fax machine is set to a mode other than the first mode, even when the two handsets are communicating with each other through the extension line.

* * * * *